United States Patent [19]

Borowsky

[11] Patent Number: 4,576,453

[45] Date of Patent: Mar. 18, 1986

[54] LIGHT-OCCLUDING CONTACT LENS

[76] Inventor: Richard Borowsky, 17 Amherst Ct., Rockville Centre, N.Y. 11570

[21] Appl. No.: 637,597

[22] Filed: Aug. 3, 1984

[51] Int. Cl.$^4$ .......................... G02C 7/04; G02C 7/10
[52] U.S. Cl. .................................................... 351/162
[58] Field of Search ........................... 351/160 R, 162

[56] References Cited

U.S. PATENT DOCUMENTS 3,034,403 5/1962 Neefe .................................... 351/162
4,121,885 10/1978 Erickson et al. ............ 351/160 H X Primary Examiner—John K. Corbin
Assistant Examiner—Scott J. Sugarman
Attorney, Agent, or Firm—Auslander & Thomas

[57] ABSTRACT

A contact lens is featured for use by light sensitive wearers. The lens comprises a centrally shaded portion whose shade is optically graded from a relatively darker center to a relatively light or transparent periphery. The diameter of the shade is greater than a fully contracted pupil, as when the eye is exposed to bright sunlight, but less than a fully dilated pupil, as when the eye is exposed to very dim light.

16 Claims, 4 Drawing Figures

LIGHT-OCCLUDING CONTACT LENS

This invention relates to a shaded contact lens, and more particularly to an optically graded contact lens for occluding light for light sensitive lens wearers.

For eyeglass wearers who have a particular sensitivity to light, there have been developed lenses that darken in response to bright light and lighten in the absence of high light levels.

For contact lens wearers who likewise have a light sensitivity, the tinted or colored lenses now available provide essentially only cosmetic advantages.

A contact lens was developed that attempted to automatically adjust the amount of light falling upon the retina of the eye. This lens which is the subject of a U.S. patent to Charles W. Neefe, U.S. Pat. No. 3,034,403, issued May 15, 1962, provides an opaque dot at the center of the contact lens. The opaque spot is about the size of the contracted pupil in bright sunlight and adjusts the light reaching the retina by the pupillary reflex action of the iris.

While the above-mentioned lens does provide the claimed advantage of adjusting the light reaching the retina, it has been less than satisfactory in terms of wearer comfort. The opaque spot, which is in the middle of the field of view, produces a shadowed spot on the retina. The wearer of the lens is aware of the presence of this spot which is distracting and annoying. The spot results from an abrupt transition in the amount of light falling upon the retina caused by the abrupt changes in optical desnity of the lens in the region of the spot. Also because of the sharp changes in the amount of transmitted light due to the abrupt transition, the Neefe lens can lead to pupillary oscillations due to pupillary reflex "overshoot" in bright light.

The present invention seeks to improve upon the aforementioned lens by providing a lens that is comfortable to wear, and one in which the user will not be perceptibly aware of the pressure of a spot or transition on the lens. The inventive lens minimizes neuromuscular instability of the pupil size, i.e., pupillary oscillation.

The invention features a contact lens that has a light-occluding ability by means of a shaded portion that has a graded optical density. The inventive lens, in combination with the eye and its pupillary reflex, constitutes a system that automatically compensates for changes in light levels. The system characteristics are superior to those of the unaided eye and can be altered by changes in the design of the lens shade. Generally speaking, the shaded area of this lens is larger than a dot the size of a contracted pupil, as previously mentioned. The perceptibility of the larger shaded area is less than the smaller dot because of its greater size and because of the gradual transition of absorbance across the lens.

The gradation in optical density of the lens extends across the lens from a relatively darker center portion to a relatively lighter peripheral portion.

The graded area generally has a diameter lying between a fully contracted pupil, subject to bright light and a dilated pupil subject to dim light.

An average diameter for the shaded portion is approximately 4.5 mm. The typical diameter of a contracted pupil is about 2 mm and the typical diameter of the dilated pupil is about 8 mm. The shaded area, therefore, lies typically about half way between these extremes.

The gradation of the shaded portion can be made to vary linearly, exponentially or according to other monotonic formulae, i.e., parabolic, etc.

An object of the gradation is to vary the optical density in a gradual manner to be imperceptible to the lens wearer.

The graded lens designed according to this invention can provide a light transmittance of approximately 80 percent in a dim light and only approximately 10 percent in a bright light.

Typical dim light as in a building interior or as in indoor work areas varies between 4 and 125 foot candles, incident bright light, such as sunlight, equals 5000–10,000 foot candles.

The shaded area of the contact lens has an optical density which grades approximately from 0 to 1.4 O.D.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Preferably, this invention features a safe contact lens of hydrogel or similar water and oxygen-permeable material. While the preferred embodiment of the invention is for a soft contact lens, the inventive concept is not so limited and can be used in other lenses such as hard contact lenses.

The inventive lens automatically compensates for changes in light levels and is particularly useful for lens wearers having a sensitivity to light. The inventive lens has a central portion that is shaded. The shading or optical density is maximum at the center and typically decreases to zero at the periphery. The shaded portion has a typical diameter of 4.5 mm, which is less than a dilated pupil, but greater than a fully contracted pupil, i.e., lies midway between 8 mm and 2 mm in diameter.

The shaded portion is optically graded in a linear fashion, but the gradation can be varied exponentially or according to some other mathematical formulae.

The lens itself does not change with changes in light intensity. The lens design is such that compensation for changes in light level is provided by the pupillary reflex of the eye. Compensatory changes are almost instantaneous as the eye automatically adjusts to the most comfortable light level. The key design element is a central dark spot (shade) on the soft-lens which is smaller than the dilated pupil. As aforementioned, the shade varies in optical density, being darkest at its center and grading down to transparency at its periphery. The average optical density of the lens portion transmitting light depends, therefore, on the size of the pupil. As light levels increase, the pupil shrinks in diameter and the working portion of the lens increases in means optical density. As light levels decrease, the pupil dilates and the working portion of the lens decreases in optical density.

Figure 1:
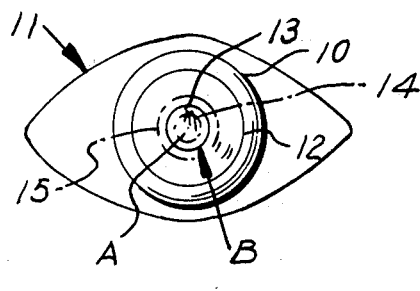
FIG. 1 is a plan view of a contact lens of this invention disposed upon an eye; the pupil of the eye is illustrated in phantom in both a contracted and in a dilated state.

Now referring to FIG. 1, the inventive contact lens 10 is sown as it rests upon an eye 11. The contact lens is slightly larger than the iris 12. The lens 10 has a central shaded portion 13, as shown. The shaded portion is optically graded from a maximum shading at the center "A" to transparency at its periphery "B." The shaded portion 13 is approximately 4.5 mm in diameter, which is larger than the fully constructed pupil 14 (shown in phantom), but smaller than the fully dilated pupil 15 (shown in phantom).

The density characteristics of the shade and its size, relative to the size of the pupil, determine the compensatory behavior of the lens-eye system. The following example treats the characteristics of a system based on a shade that grades linearly from an optical density of zero at its periphery to a maximum at its center and provides a mean transmittance (t) according to the formula:

$$t = \frac{2}{10^b r^2} \int_{r=0}^{r=a} r(10^r) \, dr$$

where optical density or absorbance at the center ("A" of FIG. 1) of the shade 13, a=the radius of the shade covering the pupil, expressed as a proportion of the radius of the full shade and r=the distance from the center of the shade 13.

Figure 2:
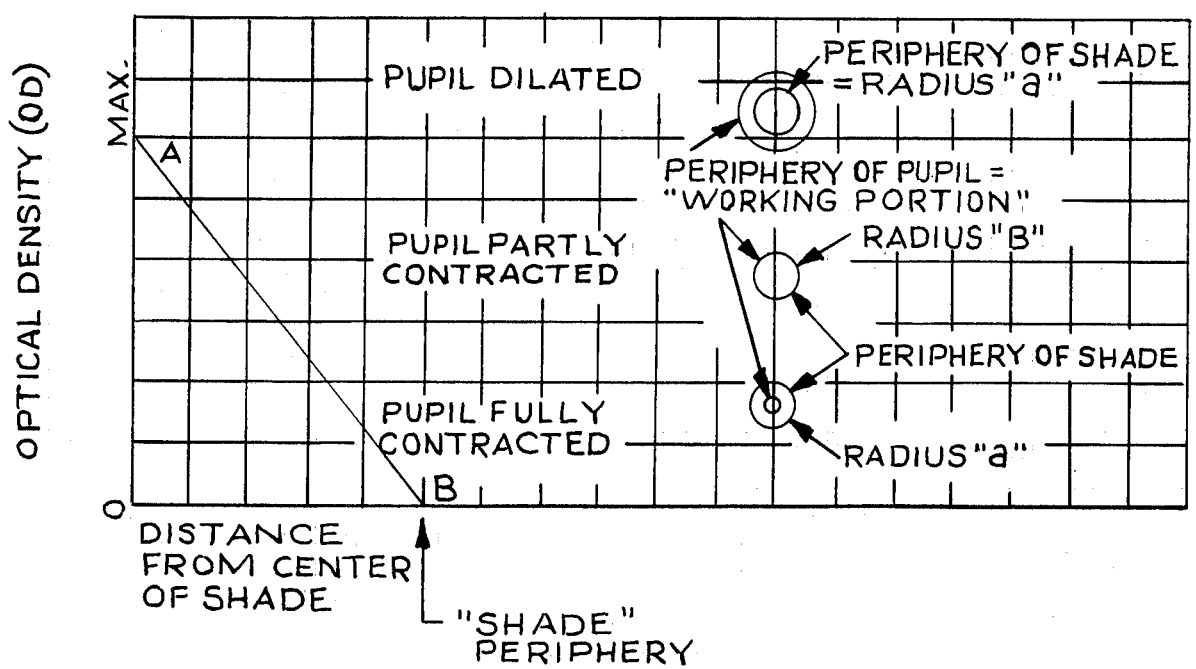
FIG. 2 is a graph of the optical density of the shaded portion of the lens as a function of the shaded portion, peripheral distance from the center of the lens in millimeters.

FIG. 2 illustrates the absorbance of a typical lens shade as a linearly decreasing function of distance from the central axis of the lens and illustrates the periphery of the shade and the periphery of the pupil, where the pupil has a relative radius "a".

Figure 3:
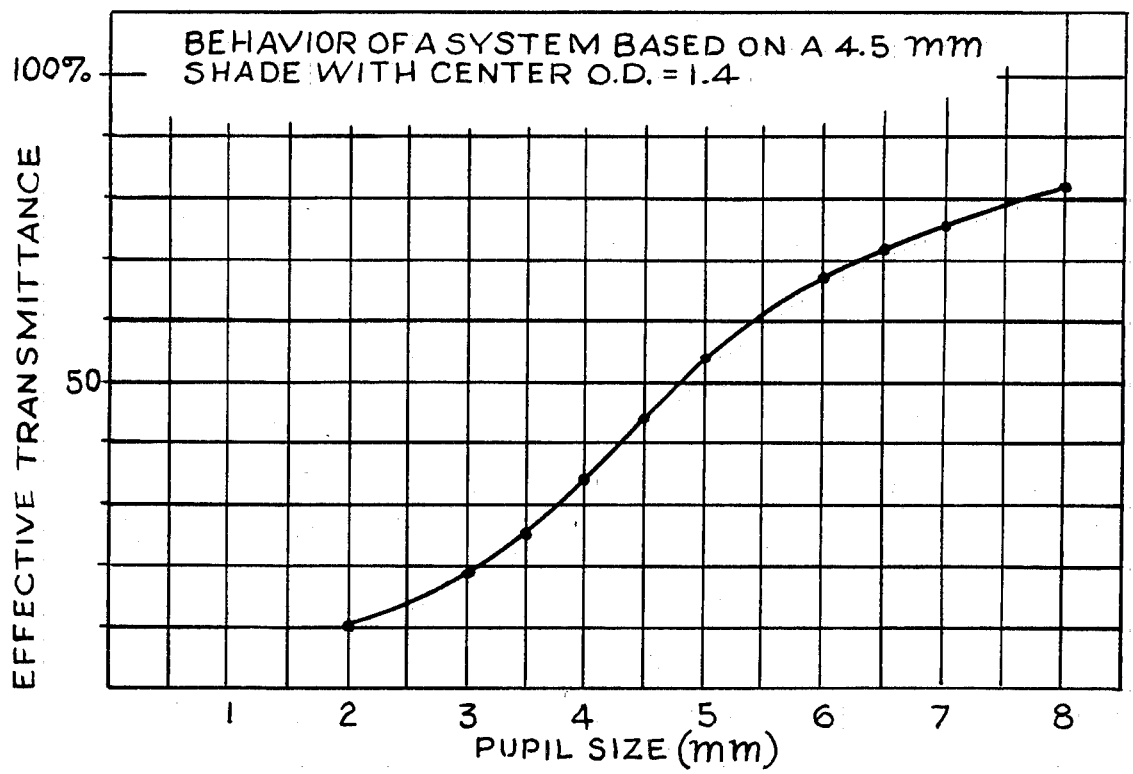
FIG. 3 is a graph of the effective transmittance of a typical inventive lens-eye system with respect to the pupil size of the lens wearer.

Referring to the behavior of a typical lens-eye system design as illustrated in FIG. 3, as the effective transmittance as a function of the absolute pupil size, i.e., a diameter between the contracted pupil 14 and the dilated pupil 15 of FIG. 1.

The shade diameter was 4.5 mm and an optical density of 1.4 was chosen for point "A" of shade 13. Values for normally contracted and dilated pupils were typically chosen as 2 mm and 8 mm in diameter, repectively.

From the graph in FIG. 3, it is observed that the inventive lens is capable of an 80 percent transmittance in dim light, which is defined as light having an approximate intensity of between 4 and 125 foot candles; and a 10 percent transmittance in bright light, which is defined as light having an approximate intensity of greater than 5000 foot candles.

This result is for the linear system of FIG. 2, but different transmittances can be achieved with exponential shading or other gradations.

EXAMPLE

A prototype lens was fabricated with a 3.5 mm shade of uniform density. A uniform shade is not ideal, but the prototype served to demonstrate that the method of fabrication works. When the prototype was worn and a bright light switched on, a compensatory darkening was experienced within a fraction of a second. When the light was switched off, a compensatory lightening was also experienced in a fraction of a second.

The prototype was made by floating the unshaded hydrogel lens (inner side up) on a 1% sodium chloride solution and placing a drop of 1% silver nitrate solution at the center of the concavity. The two solutions met via diffusion and produced a silver chloride precipitate within the gel matrix. Different halides can be used to produce silver halide precipitates with varying photochemical properties. The silver was then exposed to light. The lens was then washed in distilled water and placed in commercial developer to yield a reduced silver shade. Excess silver chloride was then removed with fixer having the formula:

STANDARD FIXER

Sodium thiosulfate 24%
Sodium sulfate 1.5%
Acetic acid 1.34%
Boric acid 0.75%
Potassium alum in water 1.5%

The lens was then washed in distilled water and boiled in opthalmic saline for 2 hours. Treatment with fixer reduced the flexibility of the lens greatly but this was restored by the saline treatment. The lens was then treated with a solution of gold chloride (0.01%) in standard fixer for 2 days in order to replace and coat the silver with gold. Finally, it was boiled again in saline for two hours. No difference was observed between the modified lens and the original in terms of flexibility and wearing comfort. The Example illustrates that hydrogel lenses can be shaded by photochemical techniques.

Experiments have shown that the silver halide precipitated in the hydrogel matrix in photosensitive.

To produce a graded shade using the above techniques, the lens is exposed to a graded light pattern after the silver chloride is internally deposited within the lens. The exposed graded silver chloride is then developed and fixed as before, with final replacement with gold, as aforementioned.

A graded shade was made in the center of the lens by placing the lens on a round form, convex up. The edge of the lens was dipped into an electrolyte solution of sodium nitrate and its electrolyte solution was made negative with respect to an applicator 20 which was positive.

Figure 4:
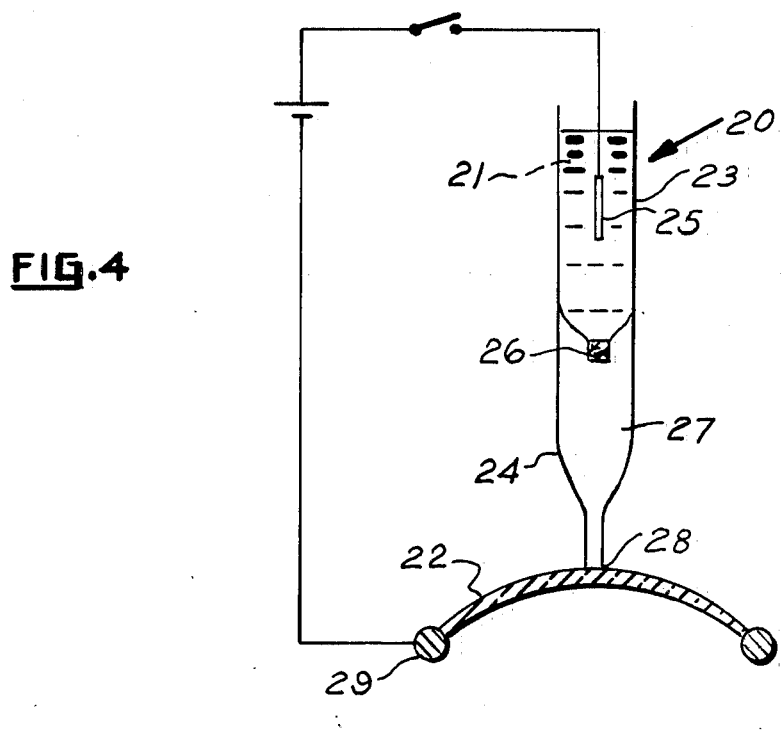
FIG. 4 is a schematic of an applicator system.

The applicator 20 was a capillary tube containing a silver nitrate solution 21, which was placed at the center of the lens 22, shown in cross section in FIG. 4. The positive silver ions migrated out of the capillary tube into the lens matrix and, of course, were most concentrated at the center where the applicator 20 sat and became less and less concentrated as they move out in all directions towards the periphery. After an appropriate amount of time, the applicator 20 was removed, the lens was removed and placed into a chloride or a halide solution to give a silver halide precipitate which was then developed and the native silver replaced by methods already disclosed.

The applicator 20 consisted of two chambers 23, 24. The upper chamber 23 was filled with a (1%) slver nitrate solution 21 which was in contact with a plating electrode 25 and also in contact with the lower chamber 24 via a fiber block junction 26. The lower chamber 24 was initially filled with a sodium nitrate solution 27, the concentration of which was varied to produce shades of different characteristics. The bottom of the lower chamber 24 was drawn to a fine point 28 (1 mm in diameter), was open, and completed the electric circuit by contacting the center of the lens to be treated. The lens 22 was emplaced in an annular cathode 29.

When the switch was closed, sodium ions flowed from the lower chamber 24 into the lens 22 and were replaced by silver ions from the upper chamber 23. The concentration of silver rose in the lower chamber 24 from an initial level of zero, and silver ions began to migrate into the lens. As the silver entered the lens it migrated out in a circular pattern towards the peripheral annular cathode 29. Since the absolute concentration of silver and its concentration relative to that of sodium increased as the current flowed, the rate at which silver entered the lens also increased with time. This increasing concentration produced the gradation essential for the shade.

Control over shade parameters is obtained by varying the initial concentration of sodium ions in the lower chamber 24 and the lens 22, if desired, by altering concentrations during the shade application by use of flush ports (not shown).

After an appropriate amount of time, the applicator 20 was removed, the lens 22 was removed and placed into a chloride or halide solution to give a silver halide precipitate which is then developed and the native silver replaced by methods already disclosed.

A graded lens produced by this process exhibited the desired properties of compensating for changes in light levels without giving the wearer the annoying perception of a dark spot in the field of vision.

A further improvement in technique insures that the gold deposit is internal to the lens and never comes in contact with the tissues of the wearer. After the silver halide precipitate is produced in the lens, the lens is treated to remove the precipitate from its superficial layers. This was accomplished by dehydrating the lens in warm glycerol, dipping it briefly in fixer, and then washing it in water. The fixer removed silver halide from the lens and the glycerol prevented the fixer from penetrating too deeply below the surface. Subsequent treatment of the lens was as described previously.

The shaded lens of the present invention can be fabricated by the photochemical techniques illustrated in the Examples above, or by other coloring, tinting and shading processes well known and common in the art.

The aforementioned methods have the advantage of producing a shade in which only native gold remains in the lens, which is completely compatible with eye tissue. These technique are applicable to both spun cast and lathe cut lenses.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A light-occluding contact lens having a shaded portion that has a progressive graded optical density whose gradation extends across the lens from a relatively darker center portion to a relatively lighter peripheral portion, and said gradation extending across the lens to a diameter between that of a dilated and contracted pupil of said lens wearer, said gradation adapted to vary optical density substantially imperceptibly to the wearer of said lens, whereby said lens is a benefit to lens wearers having a sensitivity to light.

2. The light-occluding lens of claim 1, wherein said gradation is substantially linear.

3. The light-occluding contact lens of claim 1, wherein said gradation is substantially exponential.

4. The light-occluding contact lens of claim 1, wherein said gradation varies gradually from said center portion to said peripheral portion.

5. The light-occluding contact lens of claim 1, wherein said gradation follows a formulated variation.

6. A light-occluding contact lens of claim 1, wherein said lens has an effective light transmittance of approximately 80 percent in dim light and approximately 10 percent in bright light.

7. The light-occluding contact lens of claim 1, wherein said gradation extends across the lens to a diameter between that of a dilated and contracted pupil of said lens wearer.

8. An optically graded contact lens having a progressively graded optical density in the central portion and having a light transmittance of approximately at least 80 percent in dim light and only approximately 10 percent in bright light, said dim light being defined as light of an approximated intensity of 4 to 125 foot candles, and said bright light being defined as light of an approximate intensity of 5000 to 10,000 foot candles.

9. The optically graded contact lens of claim 8, wherein said lens is optically graded between a central optical density of approximately 1.4 and a peripheral optical density of approximately zero.

10. The optically graded contact lens of claim 8, having a diameter of gradation lying between the diameter of a dilated and contracted pupil of a lens wearer.

11. The optically graded contact lens of claim 9, wherein said lens is graded substantially linearly between central and peripheral optical densities.

12. The optically graded contact lens of claim 9, wherein said lens is graded substantially exponentially between central and peripheral optical densities.

13. The optically graded contact lens of claim 9, wherein said lens is graded in accordance with a formulated variation.

14. An optically graded contact lens having progressively graded optical density in the central portion and having a light transmittance of at least approximately 80 percent in dim light wherein said pupil has dilated to approximately between 6 and 8 mm in diameter and only 10 percent in bright light wherein said pupil has contracted to approximately 2 mm in diameter.

15. The optically graded contact lens of claim 14, wherein an optically graded portion of said lens is approximately 4.5 mm in diameter.

16. The optically graded contact lens of claim 14, wherein an optical density of a central section of said graded portion is approximately 1.4

* * * * *

UNITED STATES PATENT AND TRADEMARK OFFICE
CERTIFICATE OF CORRECTION

PATENT NO. : 4,576,453
DATED : March 18, 1986
INVENTOR(S) : Richard Borowsky

It is certified that error appears in the above-identified patent and that said Letters Patent is hereby corrected as shown below:

Column 3, line 27, after "where" and before "optical", insert -- b = --

Column 4, line 13, after "Sodium" and before "1.5%", insert and change "sulfate" to -- sulfite --

Column 4, line 58, insert and change "slver" to -- silver --

Signed and Sealed this

Twenty-ninth Day of July 1986

[SEAL]

Attest:

DONALD J. QUIGG

Attesting Officer     Commissioner of Patents and Trademarks